US 8,737,966 B2

(12) United States Patent
Lee et al.

(10) Patent No.: US 8,737,966 B2
(45) Date of Patent: May 27, 2014

(54) MOBILE DEVICE SUPPORTING TOUCH SEMI-LOCK STATE AND METHOD FOR OPERATING THE SAME

(75) Inventors: Chang Soo Lee, Seosan-si (KR); Jae Hyeon Seo, Incheon (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 146 days.

(21) Appl. No.: 12/925,436

(22) Filed: Oct. 21, 2010

(65) Prior Publication Data
US 2011/0105193 A1   May 5, 2011

(30) Foreign Application Priority Data
Oct. 30, 2009   (KR) ........................ 10-2009-0104024

(51) Int. Cl.
    *H04M 1/66*   (2006.01)
(52) U.S. Cl.
    USPC ..................... 455/411; 455/550.1; 455/556.2; 455/410; 455/418; 455/566

(58) Field of Classification Search
    USPC ............ 455/550.1, 556.2, 410, 411, 418, 566
    See application file for complete search history.

(56) References Cited

U.S. PATENT DOCUMENTS

| | | | |
|---|---|---|---|
| 2006/0095864 A1* | 5/2006 | Mock et al. .................. | 715/810 |
| 2009/0006991 A1* | 1/2009 | Lindberg et al. .............. | 715/763 |
| 2009/0122018 A1* | 5/2009 | Vymenets et al. ............. | 345/173 |
| 2009/0318117 A1* | 12/2009 | Bocking et al. .............. | 455/411 |
| 2010/0001967 A1* | 1/2010 | Yoo .............................. | 345/173 |
| 2013/0005369 A1* | 1/2013 | Bocking et al. .............. | 455/466 |

* cited by examiner

*Primary Examiner* — Barry Taylor

(57) ABSTRACT

A mobile device and a method support a touch semi-lock state. When entering into the touch semi-lock state, a predefined hot menu including items and a touch-lock icon are provided on a touch screen. An output area of the touch-lock icon on the touch screen is defined as a touch event allowable region. A specific item of the hot menu is selected in response to a user input that moves the touch-lock icon onto the specific item. A particular end-user function corresponding to the selected item is activated.

20 Claims, 4 Drawing Sheets

MOBILE DEVICE SUPPORTING TOUCH SEMI-LOCK STATE AND METHOD FOR OPERATING THE SAME

CROSS-REFERENCE TO RELATED APPLICATION(S) AND CLAIM OF PRIORITY

The present application is related to and claims the benefit of priority under 35 U.S.C. §119(a) to a Korean patent application filed in the Korean Intellectual Property Office on Oct. 30, 2009, and assigned Serial No. 10-2009-0104024, the entire disclosure of which is hereby incorporated by reference.

TECHNICAL FIELD OF THE INVENTION

The present invention relates in general to a mobile device and, more particularly, to a mobile device that includes a touch screen and an operating method thereof which allow simultaneously performing the cancellation of a touch semi-lock state and the activation of a specific end-user function.

BACKGROUND OF THE INVENTION

As well known in the art, a mobile device refers to a kind of electronic device based on mobility and portability. With remarkable growths in related technologies, a great variety of mobile devices capable of supporting various end-user functions are increasingly popularized. Nowadays, such mobile devices may employ many input techniques. In particular, some mobile devices offer a touch-based input interface such as a touch screen that normally includes a touch panel and a display unit. The mobile device generates a touch event in response to a user's touch input made on the touch panel and performs a particular function based on the touch event.

In addition, the mobile device that includes the touch screen may often react to unintentional touches and consequently perform undesired functions. As such, most mobile devices provide a touch-lock function for the touch panel in order to prevent unwanted touch events from being generated. If the mobile device is in a touch semi-lock state, a user who desires to use a specific function should first cancel the touch semi-lock state. However, a process of cancelling the touch semi-lock state is somewhat complicated such that it may not be simply canceled in response to an unexpected action. In addition, because a process of activating a desired function is also complicated, a user may experience too much inconvenience.

SUMMARY OF THE INVENTION

To address the above-discussed deficiencies of the prior art, it is a primary object to provide a mobile device that includes a touch screen and an operating method thereof which allow a desired particular one of end-user functions to be quickly and easily activated in a touch semi-lock state.

According to one aspect of the present invention, provided is a method for operating a mobile device supporting a touch semi-lock state. The method includes outputting a predefined hot menu including items and a touch-lock icon on a touch screen when the mobile device enters into the touch semi-lock state. An output area of the touch-lock icon is defined on the touch screen as a touch event allowable region. A specific item of the hot menu is selected in response to a user's input for the touch-lock icon. And a particular end-user function corresponding to the selected item is activated.

According to another aspect of the present invention, provided is a mobile device supporting a touch semi-lock state. The mobile device includes a touch screen configured to generate a touch event and output a predefined hot menu and a touch-lock icon when the touch panel enters into the touch semi-lock state. And a control unit defines an output area of the touch-lock icon on the touch screen as a touch event allowable region, selects a specific item of the hot menu in response to a user's input for the touch-lock icon, and activates a particular end-user function corresponding to the selected item when a specific item of the hot menu is selected in response to a user's input for the touch-lock icon.

According to yet another aspect of the present invention, a hot menu supporting application stored in memory unit for a mobile device that supports a touch semi-lock state is provided. The hot menu supporting application includes instructions for entering a touch semi-lock state in response to one of receiving a user input and detecting no user interaction within a predefined period. The application also displays a predefined hot menu including items and a touch-lock icon on a touch screen when the mobile device enters into the touch semi-lock state. A touch event allowable region at an output area of the touch-lock icon on the touch screen and a locked region on at least one other output area are defined. When touch-lock icon is dragged to overlap the selected item while in the touch semi-lock state, the application activates a particular end-user function corresponding to a selected item.

Other aspects, advantages, and salient features of the invention will become apparent to those skilled in the art from the following detailed description, which, taken in conjunction with the annexed drawings, discloses embodiments of the invention.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 5, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged mobile device. This invention may, however, be embodied in many different forms and should not be construed as limited to the embodiments set forth herein. Rather, the disclosed embodiments are provided such that this disclosure will be thorough and complete, and will fully convey the scope of the invention to those skilled in the art. The principles and features of this invention may be employed in varied and numerous embodiments without departing from the scope of the invention.

Furthermore, well known or widely used techniques, elements, structures, and processes may not be described or illustrated in detail to avoid obscuring the essence of the present invention. Although the drawings represent embodiments of the invention, the drawings are not necessarily to scale and certain features may be exaggerated or omitted in order to better illustrate and explain the present invention.

Among terms set forth herein, a touch semi-lock state refers to a specific condition in which, when some selected icons are outputted on a display unit of a mobile device, a touch event occurring on at least one predefined region containing the outputted icons is recognized to be valid, but another touch event occurring on another region is recognized to be invalid.

Figure 1:
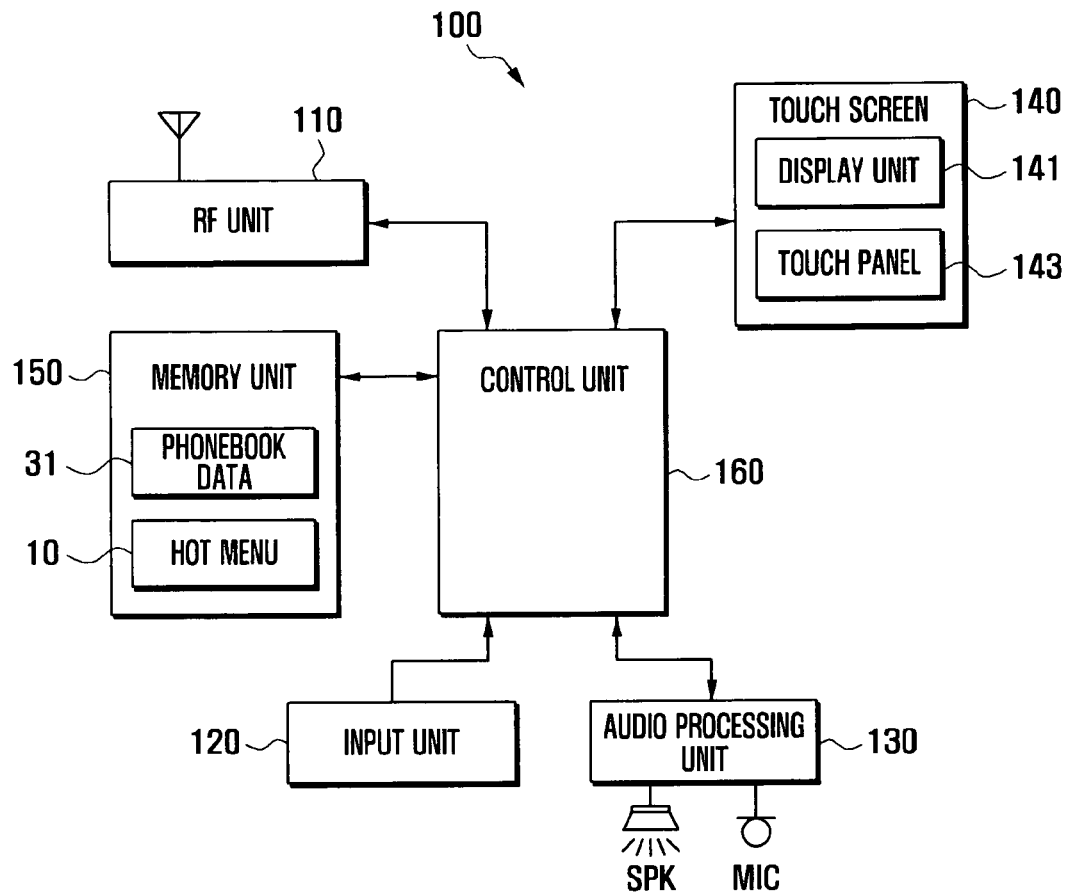
FIG. 1 illustrates a mobile device in accordance with an embodiment of the present invention.

FIG. 1 illustrates a mobile device in accordance with an embodiment of the present invention.

Referring to FIG. 1, the mobile device 100, according to an embodiment of this invention, includes a radio frequency (RF) unit 110, an input unit 120, an audio processing unit 130, a touch screen 140, a memory unit 150, and a control unit 160. The touch screen 140 includes a display unit 141 and a touch panel 143. Meanwhile, the memory unit 150 stores a phonebook data 31 and a hot menu 10.

The mobile device 100 with the above configuration may cause the touch screen 140 enter into a touch semi-lock state according to a prearranged schedule when there is no use for a given time or when receiving a predefined input signal for entering the touch semi-lock state from the input unit 120 or the touch screen 140. The mobile device 100 may then output the hot menu 10 and a touch-lock icon (or image) indicating the touch semi-lock state on the display unit 141. When a user selects a specific item of the hot menu 10 by dragging the touch-lock icon thereon, the mobile device 100 not only cancels the touch semi-lock state, but also activates an end-user function corresponding to the selected item. Therefore, based on a simple control process, the mobile device can quickly and easily activate a particular end-user function simultaneously while canceling the touch semi-lock state.

Now, each individual element of the mobile device 100 will be described in detail. Among elements to be discussed hereinafter, the RF unit 110 is utilized when the mobile device 100 has a communication function, and the audio processing unit 130 is utilized when the mobile device 100 has an audio data output function. As such, the RF unit 110 and the audio processing unit 130 are optional and may be selectively removed from the mobile device 100 in some embodiments.

The RF unit 110 establishes communication channels for a voice call, a video call, data transmission, and such, under the control of the control unit 160. Namely, the RF unit 110 forms a voice call channel, a video call channel, a data communication channel, and such, with a mobile communication system. The RF unit 110 may include an RF transmitter that upwardly converts the frequency of signals to be transmitted and amplifies the signals and an RF receiver that amplifies received signals with low-noise and downwardly converts the frequency of the received signals.

The RF unit 110 may be enabled when a touch event occurs on the touch panel 143 or when an input signal is created in the input unit 120. In the following description, it is assumed that the mobile device 100 maintains the touch panel 143 in the touch semi-lock state and also outputs the hot menu 10 on the display unit 141. If some phonebook items such as phone numbers contained in the hot menu 10 are displayed on the display unit 141, the RF unit 110 may be enabled under the control of the control unit 160 when one of the displayed phonebook items is selected by a dragged touch-lock icon. The RF unit 110 then establishes a communication channel with the mobile device indicated by the selected phonebook item. Additionally, if some webpage address items contained in the hot menu 10 are displayed on the display unit 141, the RF unit 110 may be enabled under the control of the control unit 160 when one of the displayed webpage address items is selected by a dragged touch-lock icon. The RF unit 110 then establishes a communication channel with a web server that hosts the selected webpage address item. Namely, the RF unit 110 may be enabled when a certain item associated with a communication function in the hot menu 10 is selected by the touch-lock icon dragged thereon.

The input unit 120 includes a plurality of input keys and function keys to receive a user's input and to set various functions. The function keys may have navigation keys, side keys, shortcut keys, and any other special keys defined to perform particular functions. Additionally, the input unit 120 may create a key input signal in association with a function control of the mobile device 100 and deliver it to the control unit 160. The input unit 120 may be formed of a keypad that includes a plurality of physical keys arranged in a QWERTY, 3*4, or 4*3 key layout. Also, the input unit 120 may have a virtual key layout such as a QWERTY, 3*4 or 4*3 key map, a menu map, and a soft key map displayed on the touch screen 140. Alternatively, if the touch screen 140 has a full touch screen form, the input unit 120 may include only side keys disposed on lateral sides of the mobile device 100.

In particular, the input unit 120 may offer a hot key that may be used to cancel the touch semi-lock state. In addition, the input unit 120 may create an input signal to select the touch-lock icon in the touch semi-lock state, an input signal to drag the touch-lock icon toward a specific item of the hot menu 10 displayed on the display unit 141, and an input signal to select the specific item overlapped with the touch-lock icon, and then may send such input signals to the control unit 160.

The audio processing unit 130 includes a speaker (SPK) for outputting various audio data received during a call, contained in a received message, or produced by a playback of an audio file stored in the memory unit 150, and a microphone (MIC) for collecting a user's voice, and any other audio signals during a call. Particularly, the audio processing unit 130 may output predefined sound effects when the mobile device 100 enters into or exits from the touch semi-lock state.

Also, the audio processing unit 130 may output predefined sound effects when a particular end-user function is activated by the touch-lock icon that is dragged onto a specific item of the hot menu 10 on the display unit 141. In an embodiment, these sound effects may be unavailable according to a user's setting.

The touch screen 140 includes the display unit 141 and the touch panel 143. In the touch screen 140, the touch panel 143 may be disposed on the front side of the display unit 141, completely covering the display unit 141. As such, the size of the touch screen 140 may depend on the size of the touch panel 143.

The display unit 141 displays a variety of information entered by a user or presented to a user, including various menus of the mobile device 100. For example, the display unit 140 may visually provide various screen views of an idle screen, a menu screen, a message drafting screen, a call screen, and such. The display unit 140 may be formed of an LCD (liquid crystal display), OLED (organic light emitting diodes), or any other equivalent. In addition, the display unit 141 may be disposed under the touch panel 143.

In an embodiment, the display unit 141 may output the hot menu 10 stored in the memory unit 150 under the control of the control unit 160 when the mobile device 100 enters into the touch semi-lock state. Additionally, the display unit 141 may provide a screen interface for setting the hot menu 10 where a user can register desired functions of the mobile device 100 in the hot menu 10. This interface for setting the hot menu 10 may allow the selection of various functions supported by the mobile device 100, such as a camera function, a music file play function, a dialing function, a game function, a short distance communication function, a web access function, and such. In order to support such functions, the mobile device 100 may further include optional elements such as a camera module, a short distance communication module, and such. For example, if a dialing function is selected, the display unit 141 may output a screen interface for searching the phonebook data 31 stored in the memory unit 150. A user may register desired user data in the hot menu 10 by selecting specific user data contained in the phonebook data 31. Such user data registered in the hot menu 10 may be displayed on the display unit 141 when the mobile device 100 enters into the touch semi-lock state. The above-discussed interfaces provided on the display unit 141 will be described in detail with reference to FIGS. 3 and 4.

The touch panel 143 is placed on and attached to the display unit 141. The touch panel 143 generates a touch event in response to a touch or proximity of an object such as a user's finger thereon and then transmits the generated touch event to the control unit 160. Also, the touch panel 143 sends the location and type of the touch event to the control unit 160. When receiving the touch event from the touch panel 143, the control unit 160 checks the location and type of the touch event, retrieves a specific image on the display unit 141 mapped to the checked location, and then activates a particular end-user function linked to the retrieved image.

In an embodiment, the touch panel 143 may deliver a touch event generated on the touch-lock icon to the control unit 160 while the mobile device 100 is in the touch semi-lock state. Specifically, when the mobile device 100 is in the touch semi-lock state, the touch panel 143 may define only an output area of the touch-lock icon as a touch event allowable region in which a touch event is recognized to be valid. Thereafter, if a user touches the touch-lock icon, the touch panel 143 may define the entire area as the touch event allowable region such that a user can select a specific item of the hot menu 10 by using the touch-lock icon. Namely, while touching the touch-lock icon on the touch panel 143 (i.e., a touch-down event is generated), a user drags the touch-lock icon onto a specific item of the hot menu 10 (i.e., a drag event is generated) such that the specific item may overlap the touch-lock icon. Then a user releases contact from the touch panel 143 (i.e., a touch-up event is generated). When the touch-up event occurs, the touch panel 143 may send information about the touch-up event to the control unit 160. In response, the touch semi-lock state is canceled under the control of the control unit 160, and therefore, the touch panel 143 may keep the entire area as the touch event allowable region. Meanwhile, if the touch-up event occurs without any selection of an item by the touch-lock icon (i.e. the touch-lock icon does not overlap any item), the touch panel 143 may again define the initial output area of the touch-lock icon as the only touch event allowable region. Also, the dragged touch-lock icon may be returned to the initial output location.

The memory unit 150 stores a variety of applications for functions related to an embodiment of this invention. In addition, the memory unit 150 may store a key map, a menu map, a hot menu map, and such, for the operation of the touch screen 140. The key map may have various well known types such as a keyboard map, a 3*4 key map, a QWERTY key map, or a special control key map suitable for the operation of a specific application in use. The menu map may be a special menu map suitable for the operation of a specific application in use. The memory unit 150 may consist of a program region and a data region.

The program region may store an operating system (OS) for booting and operating the mobile device 100, and applications for performing various functions of the mobile device 100, such as a call application, a web browser for surfing the Internet, an MP3 application for playing digital sounds, an image viewer application for viewing image files, a video player application, a game application, and so forth. In some embodiments, the program region may store a hot menu setting program and a hot menu supporting program.

The hot menu setting program may be loaded in the control unit 160 when a user selects a corresponding menu item or key. Specifically, the hot menu setting program may contain a routine for offering items corresponding to end-user functions that the mobile device 100 provides, a routine for registering selected items in the hot menu 10 when receiving an input signal for selecting such items from the input unit 120 or the touch screen 140, a routine for saving the items registered in the hot menu 10, a routine for deleting selected items from the hot menu 10 in response to a user's input, and so forth.

The hot menu supporting program may be activated under the control of the control unit 160 when the mobile device 100 enters into the touch semi-lock state. In an embodiment, the hot menu supporting program may contain some routines that begin to run when the mobile device enters into the touch semi-lock state and other routines that control the hot menu 10 while in the touch semi-lock state. The former routines may include a routine for detecting an entry into the touch semi-lock state, a routine for displaying the hot menu 10 and the touch-lock icon stored in the memory unit 150 on the display unit 141 when the mobile device 100 enters into the touch semi-lock state, and a routine for defining only an output area of the touch-lock icon on the touch panel 143 as a touch event allowable region. The latter routines may include a routine for creating instructions to activate a particular end-user function corresponding to a selected item when the touch-lock icon approaches one of items within a given distance, a routine for sending the instructions to the control unit 160, and a routine for canceling the touch semi-lock state of the mobile device 100. A routine for detecting the touch semi-lock state may recognize an entry into the touch semi-lock state when there is no input signal from the input unit 120 and the touch screen 140 for a given time or when a predefined input signal is received.

The data region stores data created while the mobile device 100 is used. For example, the data region may store the phonebook data 31, icons, contents, and user's inputs received from the touch panel 143. In an embodiment, the data region may store the hot menu 10 that may be selectively removed or added through the hot menu setting program.

The control unit 160 controls a power supplying and initializing process for each element of the mobile device 100. Also, as shown in FIG. 2, the control unit 160 may include sub-elements for operating the mobile device 100 based on the touch screen 140.

Figure 2:
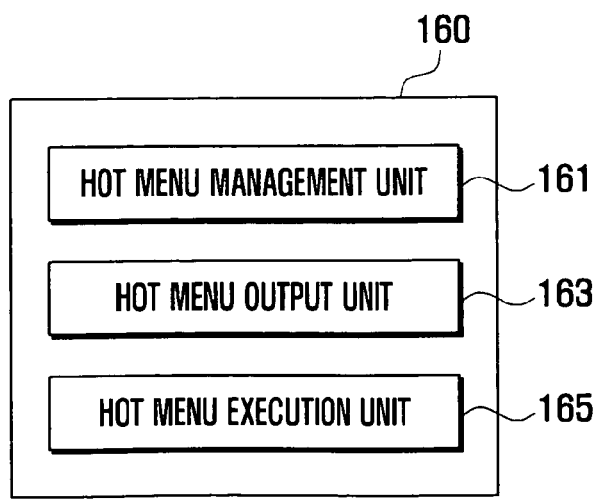
FIG. 2 illustrates the control unit shown in FIG. 1.

FIG. 2 illustrates the control unit shown in FIG. 1.

Referring to FIGS. 1 and 2, the control unit 160 includes a hot menu management unit 161, a hot menu output unit 163, and a hot menu execution unit 165.

The hot menu management unit 161 is configured by the hot menu setting program that is activated in response to an input signal received from the input unit 120 or the touch screen 140. The hot menu management unit 161 manages individual routines contained in the hot menu setting program and the hot menu 10 stored in the memory unit 150. Namely, the hot menu management unit 161 adds or deletes items in the hot menu 10 stored in the memory unit 150 in response to a user's input and then saves the modified hot menu 10 in the memory unit 150.

Additionally, the hot menu management unit 161 may automatically update the output order or types of items contained in the hot menu 10 according to a selected end-user function. For example, if the hot menu 10 contains at least one item of the phonebook data 31 for supporting a dialing function, the hot menu management unit 161 may control an update of the phonebook data 31. Namely, the hot menu management unit 161 may check a call log of the mobile device 100 and replace items of the hot menu 10 by items corresponding to frequently used calls. Similarly, the hot menu management unit 161 may automatically register frequently used end-user functions in the hot menu 10 according to an end-user function log. In an embodiment, the hot menu management unit 161 may delete rarely used items from the hot menu 10 and also may selectively lock some items of the hot menu 10 that are not to be deleted.

Figure 3:
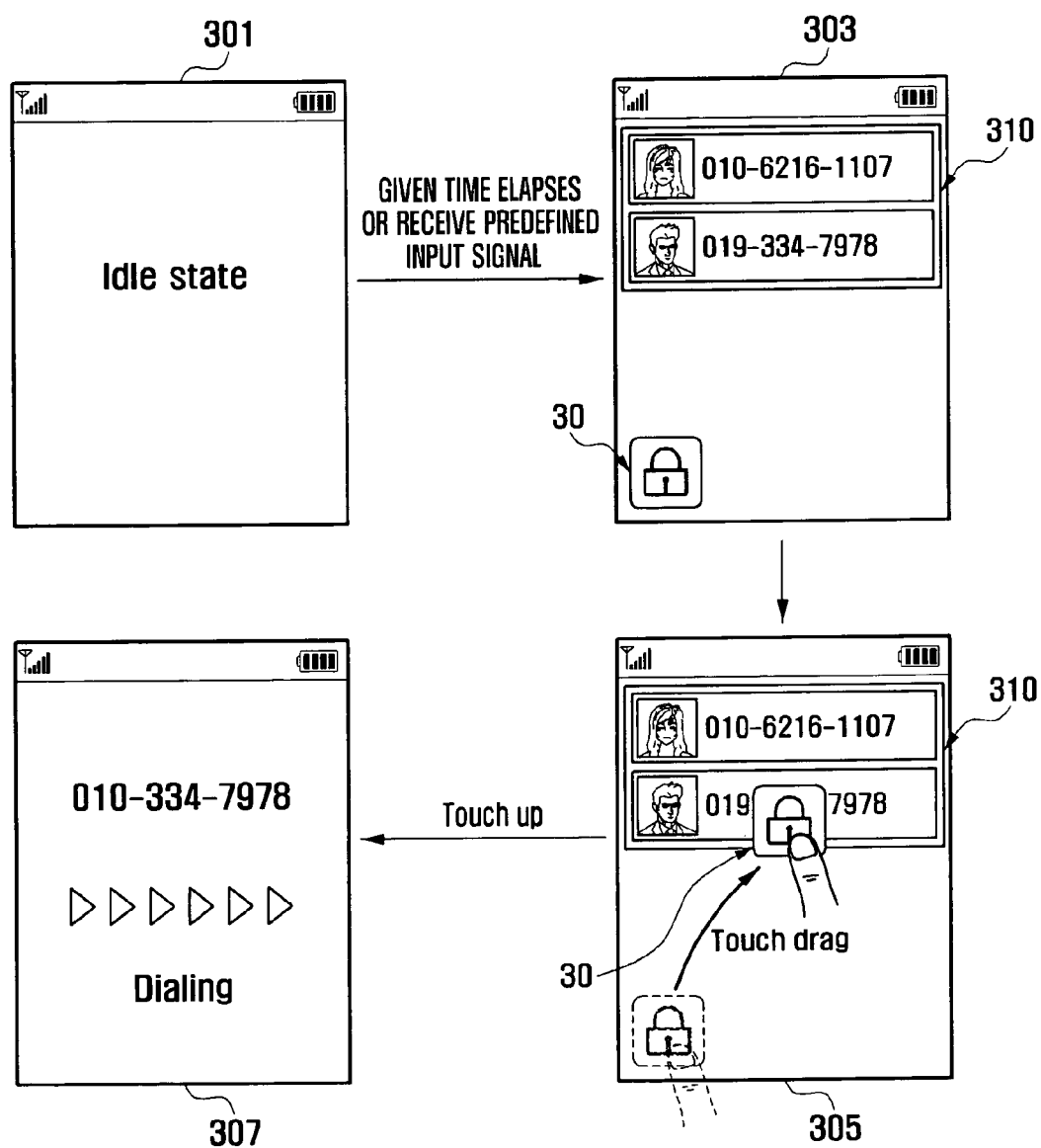
FIG. 3 illustrates a user interface of a mobile device in accordance with an embodiment of the present invention.

The hot menu output unit 163 is configured to retrieve the hot menu 10 from the memory unit 150 and then to display the hot menu 10 on the display unit 141 when the mobile device 100 enters into the touch semi-lock state. Specifically, when the control unit 160 activates the hot menu supporting program, a routine in the hot menu supporting program detects an entry into the touch semi-lock state and sends a detection result to the control unit 160. The hot menu output unit 163 then outputs the hot menu 10 retrieved from the memory unit 150 at a predefined region on the display unit 141. In addition, the hot menu output unit 163 may further output the touch-lock icon (as shown in FIG. 3) at another user-defined region on the display unit 141.

The hot menu execution unit 165 is configured to perform a particular end-user function corresponding to a specific item of the hot menu 10 selected by the touch-lock icon. In an embodiment, the touch-lock icon may be moved in response to an input signal received from the input unit 120 or the touch screen 140 and then may either approach within a given distance or overlap one of items of the hot menu 10. At this time, the hot menu execution unit 165 may recognize the approach or overlap of the touch-lock icon, depending on location information about the touch-lock icon and the items. Additionally, the hot menu execution unit 165 may recognize the occurrence of a touch-up event from the touch panel 143 while the touch-lock icon and a specific item are adjacent or overlapping on the display unit 141. Also, the hot menu execution unit 165 determines a specific end-user function linked to the selected item and then activates a suitable application to perform the selected end-user function such as a dialing function, a camera function, a music play function, a file search function, a web access function, and so forth.

As discussed, the mobile device 100, according to an embodiment of this invention, outputs the hot menu 10 on the display unit 141 while in the touch semi-lock state. In an embodiment, when a user selects a specific item of the hot menu 10 by dragging the touch-lock icon thereon, the mobile device 100 cancels the touch semi-lock state and also activates a particular end-user function corresponding to the selected item. Therefore, the mobile device 100 can quickly and easily perform a selected end-user function even in the touch semi-lock state.

Now, a user interface provided by the mobile device 100 will be described in detail with reference to FIGS. 3 and 4.

FIG. 3 illustrates a user interface of a mobile device in accordance with an embodiment of the present invention.

Referring to FIGS. 1 and 3, when power is supplied, the control unit 160 of the mobile device 100 initializes individual elements and then outputs a predefined idle screen according to a given schedule as shown in the first screen view 301. If a certain end-user function is activated in response to an input signal received from the input unit 120 or the touch screen 140, the control unit 160 outputs a user interface corresponding to the activated end-user function on the display unit 141. Then, if the end-user function is deactivated, the control unit 160 again outputs the idle screen on the display unit 141.

Alternatively, while in the idle state shown in the first screen view 301, if a given time elapses or if a predefined input signal is received, the control unit 160 controls the touch screen 140 to enter into the touch semi-lock state and also outputs the touch-lock icon 30 as shown in the second screen view 303. The above-mentioned given time may be adjusted according to a user's setting made through a suitable menu that the mobile device 100 provides. Also, the above-mentioned predefined input signal may be a signal received from a specific key used to enter the touch semi-lock state.

In the touch semi-lock state shown in the second screen view 303, the control unit 160 may retrieve the hot menu 10 from the memory unit 150 and then output the retrieved hot menu 10 on the display unit 141. In this example, the hot menu 10 consists of some of the phonebook data 31. Items contained in the hot menu 10 may be determined according to a user's setting, and thus the mobile device 100 may offer a hot menu setting function. If a user selects two sets of the phonebook data 31, the control unit 160 arranges phonebook images 310 corresponding to the selected sets of the phonebook data 31 on the display unit 141. Here, each phonebook image 310 displayed on the display unit 141 may partially contain each set of the phonebook data 31. For example, the phonebook image 310 may contain graphic data such as a photo, text data such as a phone number or a user name, and such. As mentioned above, the control unit 160 further outputs the touch-lock icon 30 on the display unit 141. The touch-lock icon 30 indicates that the mobile device 100 is in the touch semi-lock state. As will be described below, the touch-lock icon 30 is used to cancel the touch semi-lock state and to activate a selected end-user function. In the touch semi-lock state, only the area of the touch-lock icon may be unlocked to receive a user's touch input, while the other area on the touch panel 143 is locked. Namely, as mentioned above, only the output area of the touch-lock icon may be defined as a touch event allowable region. Here, a locked area in the touch semi-lock state does not generate a touch event, or a touch event generated in the locked area is ignored.

Thereafter, as shown in the third screen view 305, a user can touch the touch-lock icon 30 on the touch panel 143 (i.e., a touch-down event is generated). When the touch-down event occurs, the control unit 160 may temporarily cancel the touch semi-lock state applied to the entire area of the touch panel 143. Then a user can move the touch-lock icon 30 to at least partially overlap the phonebook image 310. For example, after touching the touch-lock icon 30, a user can drag the touch-lock icon 30 onto the phonebook image 310 (i.e., a drag event is generated). Thereafter, a user can select a desired one of the phonebook images 310 by removing contact from the touch panel 143 while the touch-lock icon 30 overlaps the desired phonebook image 310 on the touch panel 143 (i.e., a touch-up event is generated). When the touch-up event occurs, the control unit 160 recognizes the selection of a specific phonebook image 310 by comparing the locations of the touch-lock icon 30 and the items of the hot menu 10 at the time of the touch-up event on the touch panel 143.

Next, as shown in the fourth screen view 307, the control unit 160 may perform a particular end-user function that corresponds to the specific item selected by the touch-lock icon 30. For example, the control unit 160 may support a speed dialing function by allowing a communication channel to be formed for a phone number selected by the touch-lock icon 30. While the speed dialing function is activated, the control unit 160 may maintain or completely cancel the touch semi-lock state according to a user's setting option or the default option. In some embodiments, the user's setting option may selectively indicate a keep or cancel of the touch semi-lock state for each end-user function and also may be varied at a user's request.

Meanwhile, if the touch-up event occurs at a certain region other than the phonebook images 310 after the touch-lock icon 30 is dragged on the touch panel 143, the control unit 160 may maintain the touch semi-lock state. Additionally, if the touch-down event continues for a given time on the touch-lock icon 30 (i.e., a touch and hold event is generated), the control unit 160 may cancel the touch semi-lock state. Moreover, when the touch semi-lock state is canceled, the control unit 160 may remove the phonebook images 310 corresponding to the hot menu 10 from the display unit 141. Alternatively, the control unit 160 may keep the hot menu 10 appearing on the display unit 141 even though the touch semi-lock state is canceled.

Figure 4:
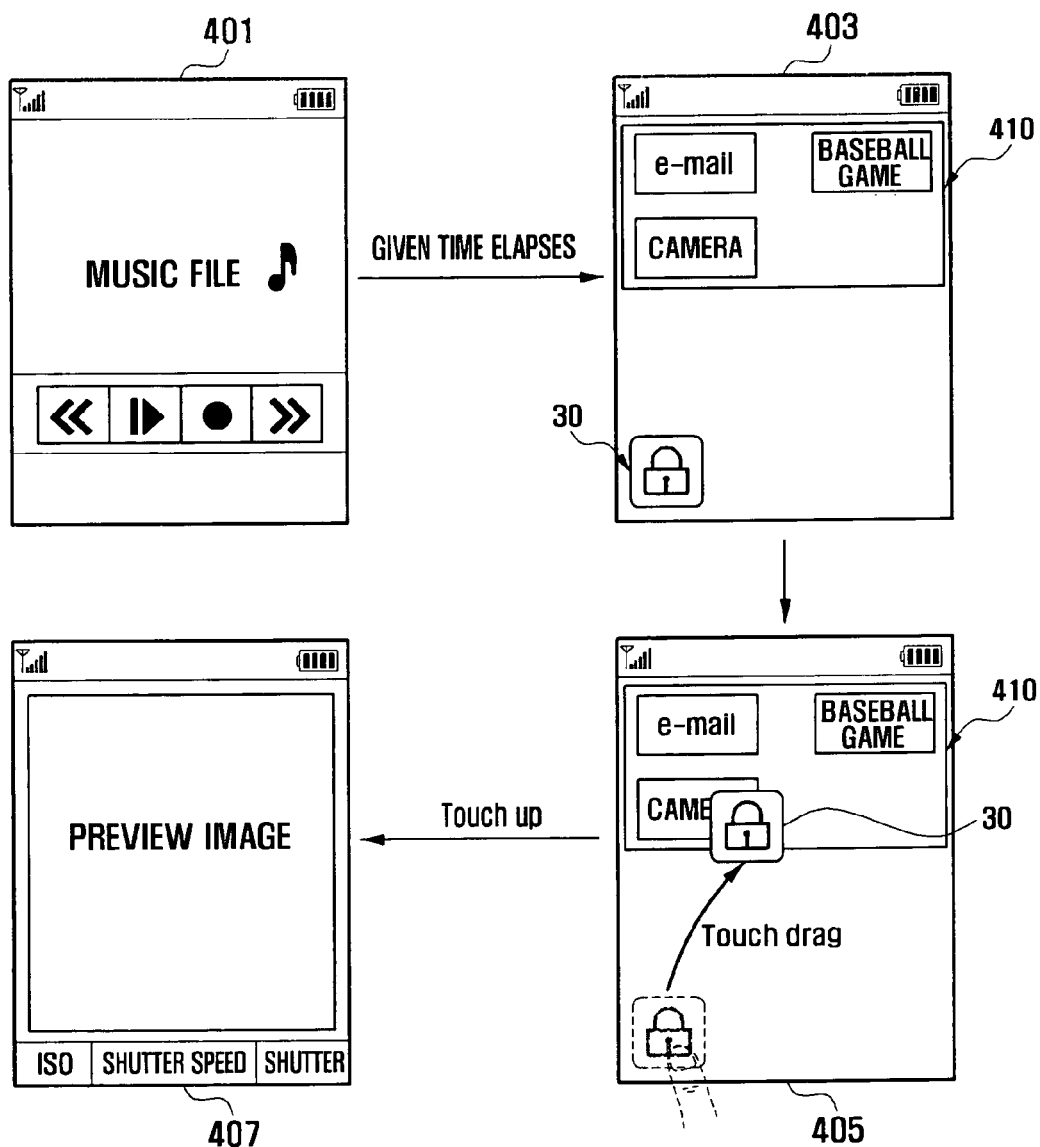
FIG. 4 illustrates a user interface of a mobile device in accordance with an embodiment of the present invention.

FIG. 4 illustrates a user interface of a mobile device in accordance with an embodiment of the present invention.

Referring to FIGS. 1 and 4, the control unit 160 of the mobile device 100 may activate a particular end-user function at a user's request and then may output a prearranged screen on the display unit 141 as shown in the first screen view 401. For example, when receiving an input signal for activating a music play function, the control unit 160 may activate a music player used for a playback of a selected music file. Then the control unit 160 may output a certain screen in connection with the activation of the music player on the display unit 141. This screen may contain a region for outputting information about a selected music file, and a region for controlling the playback of a music file in use.

Although the music player is running, the control unit 160 may cause the mobile device 100 to enter into the touch semi-lock state after a given time elapses, as shown in the second screen view 403. Therefore, the touch panel 143 may be locked except at a predefined region of the touch-lock icon 30. When the mobile device 100 enters into the touch semi-lock state, the control unit 160 may retrieve the hot menu 10 from the memory unit 150 and then output some menu images 410 on the display unit 141. The menu images 410 correspond to the retrieved hot menu 10 and are selected by a user among menu items available for the mobile device 100, such as, but not limited to, an e-mail item, a baseball game item, and a camera item. Such menu items provided as the menu images 410 may be modified, added, or deleted according to a user's setting or environments of the mobile device 100. The control unit 160 may also output the touch-lock icon 30 on the display unit 141. Here, the control unit 160 may define a specific area of the touch panel 143, being equal to or greater than the output area of the touch-lock icon 30, as a touch event allowable region.

Thereafter, as shown in the third screen view 405, a user can touch the touch-lock icon 30 on the touch panel 143 (i.e., a touch-down event is generated). Then a user can drag the touch-lock icon 30 onto the menu images 410 (i.e., a drag event is generated) and select a desired one of the menu images 410 by taking a finger off the desired menu image 410 on the touch panel 143 (i.e., a touch-up event is generated). For example, a user can drag the touch-lock icon 30 to overlap a camera item of the menu images 410 and then release the finger from the touch-lock icon 30.

Then, as shown in the fourth screen view 407, the control unit 160 may perform a particular end-user function that corresponds to the camera item selected by the touch-lock icon 30. For example, the control unit 160 may output an image acquired by a camera in a preview form on the display unit 141 and then save the acquired image in response to a given input signal received from the input unit 120 or the touch screen 140. On the other hand, if the mobile device 100 supports a multitasking function for the aforesaid music play function and the camera function, the control unit 160 may continue the music play function while the camera function is running. Therefore, the audio processing unit 130 of the mobile device 100 may output audio data produced by a playback of a music file through the speaker (SPK) or an earphone. In the fourth screen view 407, the control unit 160 may cancel the touch semi-lock state by unlocking the entire area of the touch panel 143.

As discussed, the user interface, according to embodiments of this invention, outputs some images related to items of the hot menu 10 on the display unit 141 while in the touch semi-lock state. When a user selects a specific one of such images by dragging the touch-lock icon thereon, the user interface allows the mobile device 100 to activate a particular end-user function corresponding to the selected image as well as to cancel the touch semi-lock state. Therefore, the mobile device 100 can quickly and easily perform a selected end-user function even in the touch semi-lock state and simultaneously cancel the touch semi-lock state.

Now, a method for operating the mobile device 100 will be described in detail with reference to the drawings.

Figure 5:
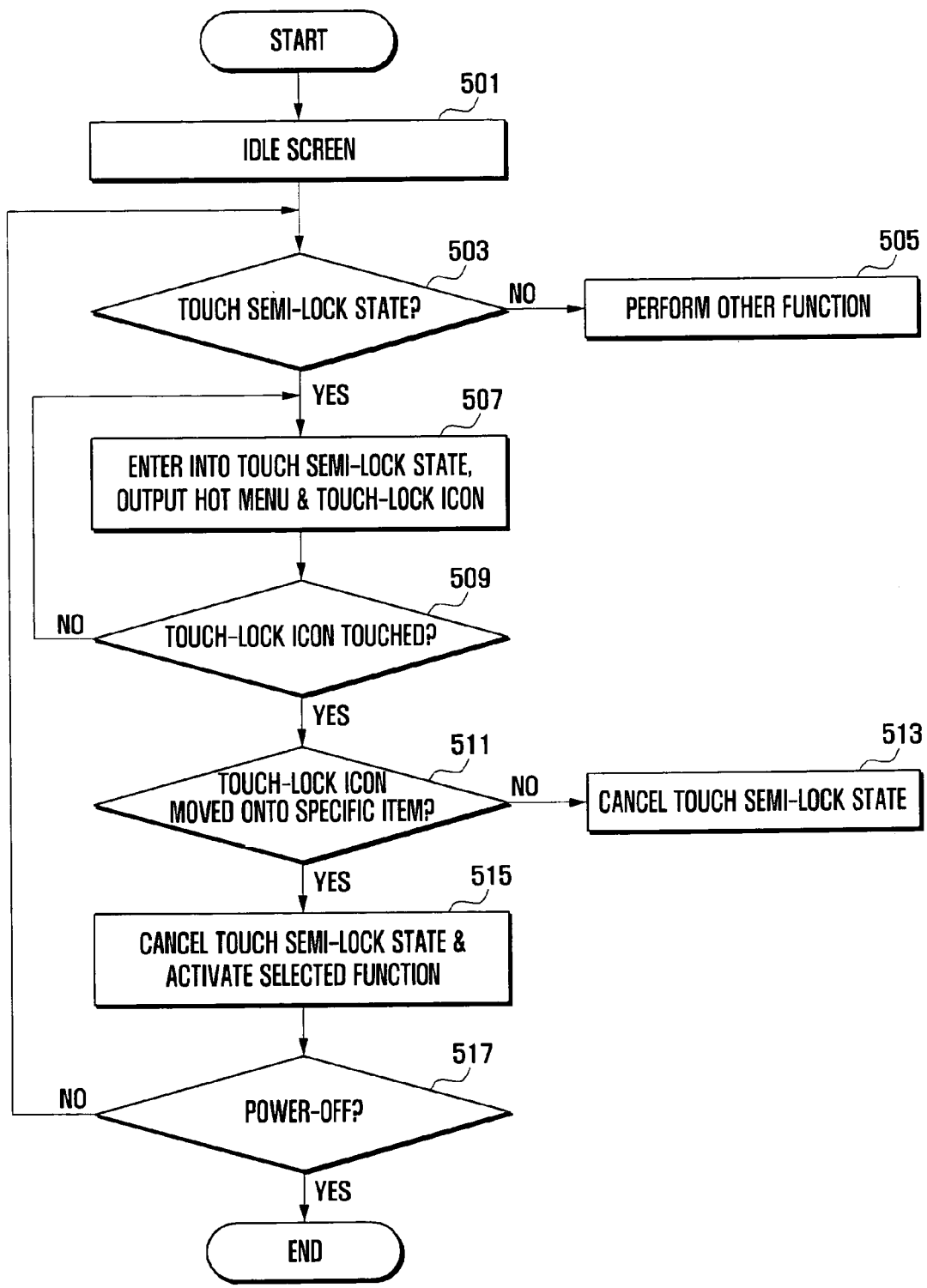
FIG. 5 illustrates a process for operating a mobile device in accordance with an embodiment of the present invention.

FIG. 5 illustrates a process for operating a mobile device in accordance with an embodiment of the present invention.

Referring to FIGS. 1 to 5, when power is supplied, the control unit 160 of the mobile device 100 initializes each element of the mobile device 100 and then outputs a predefined idle screen on the display unit 141 according to a given schedule in block 501. Additionally, when a certain end-user function in use is deactivated or if a sleep mode is canceled, the control unit 160 may output the idle screen on the display unit 141 according to a given schedule.

In block 503, the control unit 160 receives an input signal from the input unit 120 or the touch screen 140, and then determines whether the received input signal is for an entry into the touch semi-lock state. When receiving an input signal from a specific key in the input unit 120 or when there is no input signal for a given time, the control unit 160 may determine that the input signal indicating an entry into the touch semi-lock state is received.

If the received input signal is not for an entry into the touch semi-lock state, the control unit 160 performs a particular function corresponding to the received input signal in block 505. For example, the control unit 160 may perform a camera function, a call function, a music file play function, a search function, a web access function, and so forth, in response to the received input signal. Additionally, the control unit 160 may maintain a specific end-user function earlier activated if there is no input signal for a given time.

If the received input signal is for an entry into the touch semi-lock state, the control unit 160 enters into the touch semi-lock state and then outputs the hot menu 10 and the touch-lock icon 30 on the display unit 141 in block 507. In an embodiment, the control unit 160 retrieves the hot menu 10 from the memory unit 150 and then arranges items contained in the hot menu 10 on the display unit 141. In addition, the control unit 160 may define an output area of the touch-lock icon 30 as the only touch event allowable region on the touch panel 143. Therefore, even though displayed on the touch screen 140, the hot menu 10 may not respond to any touch event at this time.

In block 509, the control unit 160 determines whether an input signal for touching the touch-lock icon 30 is received from the touch screen 140. If the received input signal is not related to the touch-lock icon 30, the control unit 160 remains in the touch semi-lock state in block 507. If the received input signal indicates a touch on the touch-lock icon 30, the control unit 160 temporarily defines the entire area of the touch panel 143 as the touch event allowable region and then traces a change in location of the touch-lock icon 30. Meanwhile, if the mobile device 100 is designed to determine the validity of a touch event received from the touch panel 143 depending on whether to enter into the touch semi-lock state, it is not always required to expand the touch event allowable region. Namely, after a touch event occurs on the touch-lock icon 30, the control unit 160 may accept any subsequent touch event as a valid touch event without expanding the touch event allowable region. Alternatively, the control unit 160 may disregard all touch events occurring on any regions other than the touch-lock icon 30 by accepting them as invalid touch events.

In block 511, the control unit 160 determines whether the touch-lock icon 30 is moved onto a certain item of the hot menu 10. For example, the control unit 160 determines whether the touch-lock icon 30 overlaps one of the items arranged in the hot menu 10 on the display unit 141. If the touch-lock icon 30 is not placed on any item, the control unit 160 may perform a particular function in response to any other input signal. For example, when receiving an input signal for canceling the touch semi-lock state, the control unit 160 may cancel the touch semi-lock state in response to the received input signal in block 513. Alternatively, if the touch-lock icon 30 is not placed on any time, the control unit may return to the touch semi-lock state.

If the touch-lock icon 30 is placed on a selected one of items contained in the hot menu 10 in block 511—namely, if the touch-lock icon 30 overlaps a selected item and then the touch-up event occurs—the control unit 160 cancels the touch semi-lock state and also activates a particular end-user function corresponding to the selected item in block 515. For example, if the selected item corresponds to the phonebook data 31, the control unit 160 performs a dialing function based on the selected phonebook data 31. At this time, the control unit 160 may maintain or cancel the touch semi-lock state according to a predetermined option. Alternatively, if the selected item is related to a web access function, the control unit 160 may perform a communication function to access a specific server based on a sever address contained in the selected item. Likewise, when a specific item of the hot menu 10 is selected by the touch-lock icon 30 placed thereon, the control unit 160 not only cancels the touch semi-lock state, but also activates an end-user function corresponding to the selected item.

In block 517, the control unit 160 determines whether to turn off the power. If there is no input signal for power-off, the control unit 160 returns to block 503 and then repeats the process.

Although in the aforesaid embodiment the touch-lock icon 30 is moved in response to a touch-down event and a drag event on the touch screen 140 and then selects a specific one item in response to a touch-up event, this is only illustrative and not to be considered as a limitation of the present invention. Alternatively, the touch-lock icon 30 may be moved depending on the navigation key of the input unit 120 and then select an item depending on the OK key of the input unit 120 and highlight effects on the display unit 141.

The above-discussed mobile device 100 may essentially or selectively include any other elements. For example, the mobile device 100 may further include a short distance communication module, a digital camera module, a wired or wireless data transmission interface, an Internet access module, a digital broadcast receiving module, and so forth. According to a digital convergence tendency today, such elements may be varied, modified and improved in various ways, and any other elements equivalent to the above elements may be additionally or alternatively equipped in the mobile device 100. Meanwhile, as will be understood by those skilled in the art, some of the above-mentioned elements in the mobile device 100 may be omitted or replaced with another.

Additionally, the mobile device 100 of this invention may include any types of electronic devices that may support a touch semi-lock state. For example, the mobile device may include communication devices, multimedia players and their application equipment, especially including many mobile communication terminals based on various communication protocols, a portable multimedia player (PMP), a digital broadcasting player, a personal digital assistant (PDA), a music player (e.g., an MP3 player), a portable game console, a smart phone, a notebook, a handheld personal computer, and such.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for operating a mobile device supporting a touch semi-lock state, the method comprising:
providing a predefined hot menu region and a touch-lock icon on a touch screen when the mobile device enters into the touch semi-lock state, the hot menu region comprising two or more menu images, each menu image associated with a corresponding end-user function, wherein the hot menu region is not selectable when the mobile device enters the touch semi-lock state;
temporarily setting, in response to detecting a touch-down of the touch-lock icon, the hot menu region to be selectable by the touch-lock icon such that the touch-lock icon is moveable anywhere within the hot menu region;

detecting a movement of the touch-lock icon within the hot menu region such that the touch-lock icon at least partially overlaps a first menu image of the hot menu region; and activating a particular end-user function corresponding to the first menu image in response to detecting a touch-up of the touch-lock icon, wherein the hot menu is configured to be previously set according to a user's setting.

2. The method of claim 1, wherein when the mobile device enters the touch semi-lock state, only the touch-lock icon is in a touch event allowable region.

3. The method of claim 1, wherein activating comprises initiating communication with a phone number when the first menu image comprises a phone number, or accessing a webpage when the first menu image comprises a webpage address.

4. The method of claim 3, further comprising:
checking a call log of the mobile device; and
replacing menu images of the hot menu region by menu images corresponding to frequently used calls.

5. The method of claim 1, further comprising at least one of:
automatically updating a output order or types of menu images contained in the hot menu region according to a selected end-user function; and
automatically registering frequently used end-user functions in the hot menu region according to an end-user function log.

6. The method of claim 1, further comprising at least one of:
deleting rarely used menu images from the hot menu region; and
selectively locking menu images of the hot menu region that are not to be deleted.

7. A mobile device supporting a touch semi-lock state, the mobile device comprising:
a touch screen configured to generate a touch event and output a predefined hot menu region and a touch-lock icon when the touch panel enters into the touch semi-lock state, the predefined hot menu region comprising two or more menu images, each menu image associated with a corresponding end-user function, wherein the hot menu region is not selectable when the mobile device enters the touch semi-lock state; and
a control unit configured to:
temporarily set, in response to detecting a touch-down of the touch-lock icon, the hot menu region to be selectable by the touch-lock icon such that the touch-lock icon is moveable anywhere within the hot menu region;
detect a movement of the touch-lock icon within the hot menu region such that the touch-lock icon at least partially overlaps a first menu image of the hot menu region; and
activate a particular end-user function corresponding to the first menu image in response to detecting a touch-up of the touch-lock icon,
wherein the hot menu is configured to be previously set according to a user's setting.

8. The mobile device of claim 7, wherein when the mobile device enters the touch semi-lock state, only the touch-lock icon is in a touch event allowable region.

9. The mobile device of claim 7, wherein the control unit is configured to access a webpage when the first menu image comprises a webpage address.

10. The mobile device of claim 7, wherein the control unit initiates communication with a phone number when the first menu image comprises a phone number.

11. The mobile device of claim 10, wherein the control unit checks a call log of the mobile device and replaces menu images of the hot menu region by menu images corresponding to frequently used calls.

12. The mobile device of claim 7, further comprising:
an input unit configured to create at least one of an OK key input signal for selecting the touch-lock icon, a navigation key input signal for moving the touch-lock icon onto the first menu image of the hot menu region, and an OK key input signal for selecting the first menu image.

13. The mobile device of claim 7, further comprising:
a memory unit configured to store the hot menu region.

14. The mobile device of claim 7, wherein the control unit comprises:
a hot menu management unit configured to delete a menu image contained in the hot menu region and register a new a menu image in the hot menu region;
a hot menu output unit configured to output the hot menu region on the touch screen; and
a hot menu execution unit configured to activate the end-user function corresponding to the selected menu image.

15. The mobile device of claim 14, wherein the hot menu management unit is further configured to update one of the output order and types of the menu images contained in the hot menu region.

16. The mobile device of claim 14, wherein the hot menu execution unit is further configured to cancel the touch semi-lock state according to a first predetermined option while activating the end-user function, and maintain the touch semi-lock state according to a second predetermined option while activating the end-user function.

17. The mobile device of claim 7, wherein the control unit is configured to at least one of: automatically update an output order or types of menu images contained in the hot menu region according to a selected end-user function, and automatically register frequently used end-user functions in the hot menu region according to an end-user function log.

18. The mobile device of claim 7, wherein the control unit is configured to one of: delete rarely used menu images from the hot menu region, and selectively lock at least one of menu images of the hot menu region that are not to be deleted.

19. A hot menu supporting application stored in a memory unit for a mobile device that supports a touch semi-lock state, the hot menu supporting application comprising instructions for:
displaying a predefined hot menu region and a touch-lock icon on a touch screen when the mobile device enters into a touch semi-lock state, the hot menu region comprising two or more menu images, each menu image associated with a corresponding end-user function, wherein the hot menu region is not selectable when the mobile device enters the touch semi-lock state, the two or more menu images comprising at least one of a phone number and a webpage address;
temporarily setting, in response to detecting a touch-down of the touch-lock icon, the hot menu region to be selectable by the touch-lock icon such that the touch-lock icon is moveable anywhere within the hot menu region;

detecting a movement of the touch-lock icon within the hot menu region such that the touch-lock icon at least partially overlaps a first menu image of the hot menu region; and activating a particular end-user function corresponding to first menu image in response to detecting a touch-up of the touch-lock icon, the activating comprising initiating communication with a phone number when the first menu image comprises a phone number or accessing a webpage when the first menu image comprises a webpage address.

20. The hot menu supporting application of claim 19, further comprising instructions for:

canceling the touch semi-lock state when the particular end-user function is activated according to a first predetermined option; and remaining in the touch semi-lock state when the particular end-user function is activated according to a second predetermined option.

* * * * *